M. L. SWAYZE.
POTATO DIGGER AND BEAN HARVESTER.
APPLICATION FILED DEC. 24, 1918.
1,355,014.
Patented Oct. 5, 1920.
3 SHEETS—SHEET 3.
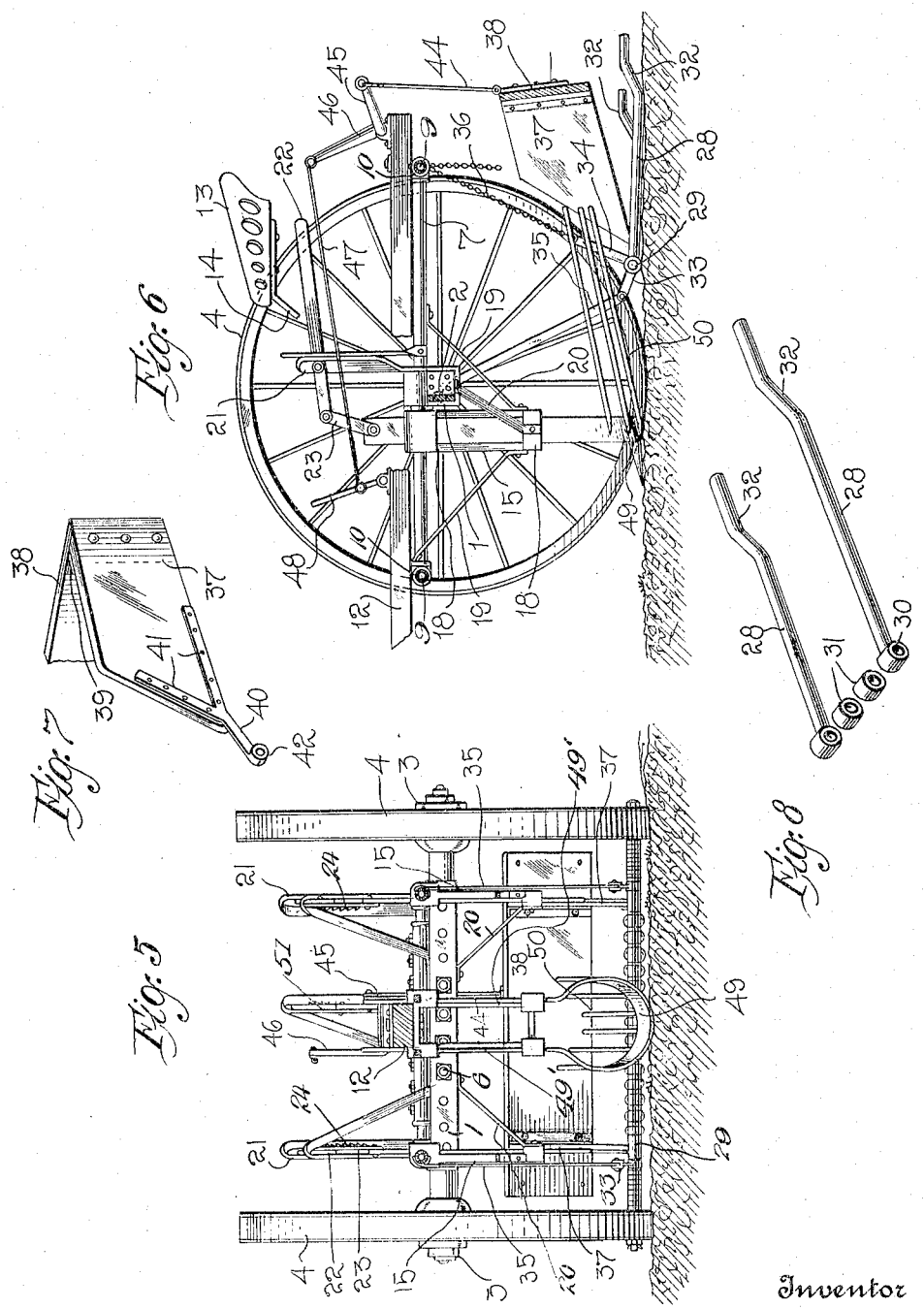
Inventor
Michael L. Swayze
By
Lacey & Lacey, Attorneys

UNITED STATES PATENT OFFICE.

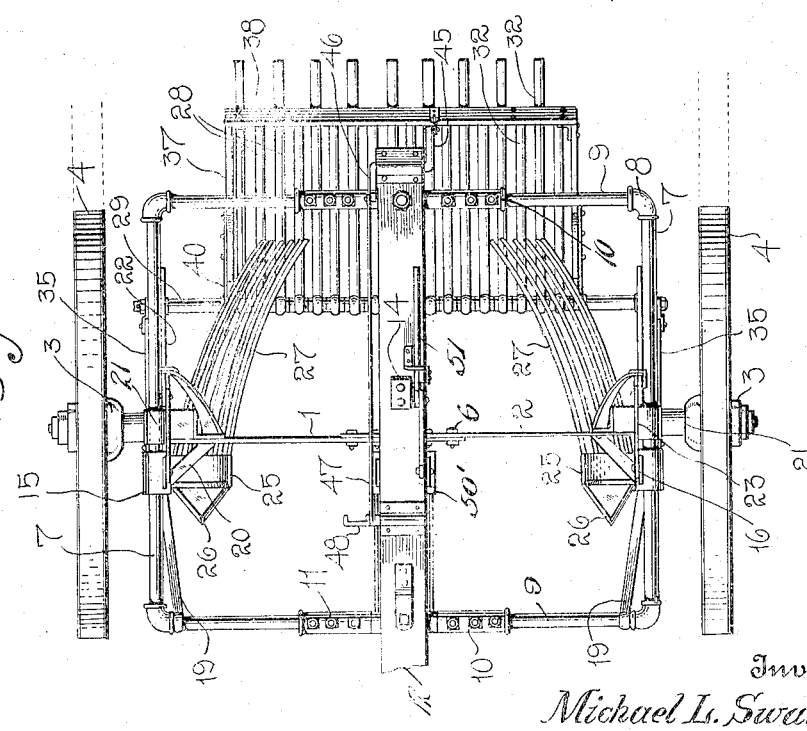

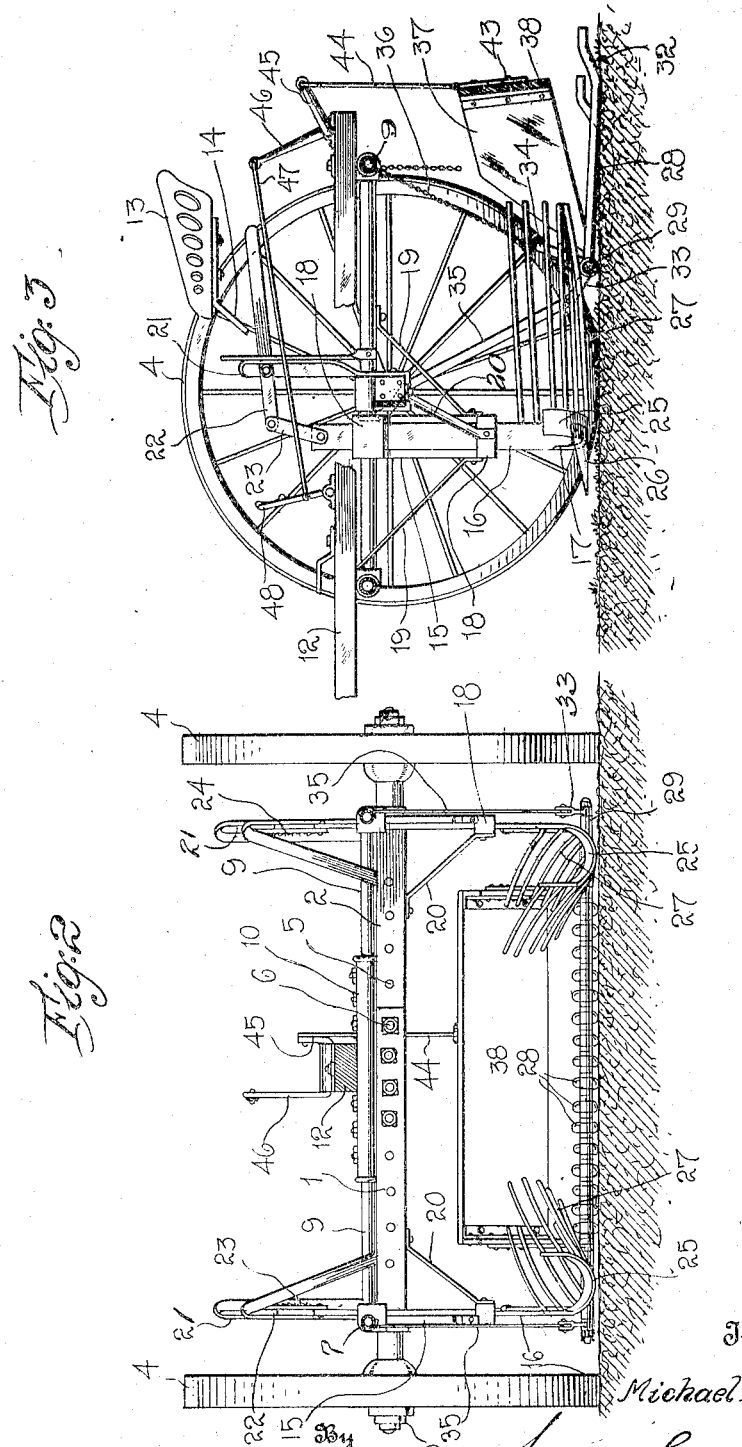

MICHAEL L. SWAYZE, OF COLORADO SPRINGS, COLORADO.

POTATO-DIGGER AND BEAN-HARVESTER.

1,355,014.   Specification of Letters Patent.   Patented Oct. 5, 1920.

Application filed December 24, 1918. Serial No. 268,137.

*To all whom it may concern:*

Be it known that I, MICHAEL L. SWAYZE, a citizen of the United States, residing at Colorado Springs, in the county of El Paso and State of Colorado, have invented certain new and useful Improvements in Potato-Diggers and Bean-Harvesters, of which the following is a specification.

This invention relates to agricultural im10 plements and has for its object the provision of a machine which may be very easily and readily arranged for harvesting beans or for digging potatoes. A further object of the invention is to provide a construction whereby the machine may be adjusted to conform to various widths of rows and a still further object of the invention is to provide novel means for retaining the beans or potatoes until a quantity has been gath20 ered and then discharging said quantity upon the ground to be subsequently marketed. The invention also seeks to improve generally the construction and arrangements of parts of an agricultural implement for the stated purposes whereby the operation of the machine will be facilitated and the life of the same prolonged.

In the accompanying drawings—

Figure 1 is a plan view of a machine em30 bodying my improvements showing the same arranged for use as a bean harvester and expanded to accommodate widely spaced rows;

Fig. 2 is a front elevation of the same;
Fig. 3 is a longitudinal section thereof;

Fig. 4 is a plan view of the machine arranged for use as a potato digger and showing it contracted so that the ground wheels will pass at opposite sides of the row or hills;

Fig. 5 is a front elevation of the machine arranged as shown in Fig. 4;

Fig. 6 is a longitudinal section of the same;
Fig. 7 is a detail perspective view of a portion of the bunching gate or retainer;

Fig. 8 is a detail perspective view of two of the fingers which constitute the bottom of the buncher.

In carrying out my invention, I employ an axle consisting of two bars 1 and 2 which have suitably secured to their outer ends hubs 3 upon which ground wheels 4 are mounted. The inner ends of these axle members or bars overlap, as shown, and are provided with a plurality of perforations or openings 5 through which bolts 6 are passed to secure the axle in extended or contracted adjustment. Upon the outer ends of the axle members, I secure, by any convenient means, the side bars 7 of the main frame and these side bars may conveniently be tubing or rods to the ends of which are secured elbows or couplings 8. The members 9 of the front and rear bars of the frame have their outer ends secured in said couplings and their inner ends are fitted in central sleeves 10 and adjustably held in said sleeves by suitable pins or bolts inserted through registering openings 11 provided in the sleeves and the inner portions of the outer members 9. It will be readily understood that by this construction the frame may be made wider or narrower as may be necessary to adjust the machine to the widths of rows so that it will not be necessary to plant rows at a set distance apart but the owner of the machine may adopt his own standard for spacing the rows and adjust his harvesting machine accordingly when his crop is ready to be gathered. The machine may be drawn over the field by any desired means and I have illustrated a draft pole or tongue 12 secured upon the central members 10 of the front and rear bars of the frame and projecting forwardly therefrom to receive and support draft devices. A seat 13 is carried by a standard 14 secured upon the draft pole or tongue so that the operator may readily guide the draft animals or otherwise control the operation of the machine.

To the side bars of the main frame, I secure hangers 15 which depend from said side bars in advance of the axle and are suitably grooved or channeled to receive standards 16 which carry the knives for severing the vines or bean plants. Eyes or loops 18 are provided at the upper and lower ends of the hangers 15 to guide and sustain the standards 16 against lateral movement and braces 19 extend from the lower ends of the hangers to the adjacent portions of the main frame at the front and rear of the hangers, as clearly shown, so as to sustain the hangers in a vertical position. Additional transverse braces 20 may be provided to connect the lower ends of the hangers with the axle so that all possible movement of the hangers will be prevented and the knives will be held in the true line of the rows from which the beans are being gathered. Posts 21 are provided upon the side bars of the main frame and upon the said posts I fulcrum hand levers 22 which have their front ends connected with the respectively adjacent standards 16 by links 23 so that the knives may be set to run at the proper depth to sever all the plants in the row along which the machine is being drawn. This arrangement of parts, furthermore, will permit the driver to quickly raise or lower the knives so that plants which may have their roots above or below the other plants in the row may be properly severed without stopping the machine. A holding rack 24 will be provided upon each post 21 to be engaged by the adjacent lever 22 so that the lever will be held normally in the position in which it may be set when starting the operation.

The severing device comprises a U-shaped or arcuate knife 25 which is carried by the lower end of the standard 16 and is disposed at the inner side of said standard. To the front edge of this knife 25 I removably secure a triangular or tapered knife 26 which projects forwardly therefrom and will be found advantageous in harvesting the plants in a sandy soil. This knife may, however, be omitted if desired when the nature of the soil does not make its use necessary. From the rear edge of the knife 25 a plurality of guiding rods 27 extend rearwardly and inwardly so that their rear ends will project over the rods or fingers 28 constituting the bottom of the buncher. It will be readily noted that the rods 27 form a trough through which the vines will be caused to travel as the machine is drawn forwardly and by which they will be guided to and delivered into the buncher and the rods will be spaced apart so that dirt which may be turned up with the vines will be permitted to separate therefrom and fall upon the ground instead of accumulating with the beans and plants in the buncher.

In rear of the knives and somewhat in advance of the rear ends of the rods 27 and below the said rods, I arrange a transverse rod or bar 29 upon which the front ends of the fingers or rods 28 are pivotally mounted, the said rods being constructed with eyes or sleeves 30 at their front ends through which the rod 29 may pass and spacing rings or collars 31 are fitted upon the rod between the front ends of the fingers so that the fingers will be uniformly spaced. The fingers 28 will ride directly upon the ground, as shown clearly in Figs. 3 and 6, and the rear ends of the fingers are offset so as to project upwardly, as shown at 32, so that the harvested plants or potatoes which will be deposited upon the fingers will not pass uninterruptedly over the rear ends of the fingers, but will be caused to travel slightly upwardly and thereby assist in freeing any small quantities of dirt which may remain therein when they are to be discharged. The rod 29 is equipped at its ends with diverging arms 33 and 34 which extend relatively forwardly and upwardly. To the front ends of the arms 33, I secure links 35 which have their upper ends secured to the sides of the frame immediately in front of the axle and to the upper ends of the arms 34 I secure chains 36 which are carried upwardly and rearwardly to the rear corners of the main frame and are attached thereto, it being thus possible to permit the rod 29 to run at a greater or less depth below the main frame as may be rendered necessary by the nature of the soil. The links 35 serve as draft elements to compel the rod 29 to travel with the machine and also prevent twisting movement of the same so that it will always remain parallel with the axle of the machine and at a right angle to the line of travel To retain the plants or vegetables upon the rods 28 until a quantity of the same has accumulated, I provide a bunching gate or retainer consisting of side plates 37 and a back plate 38 which is connected to and bridges the rear ends of said side plates. Angle-irons 39 are employed to connect the plates 37 and 38 and to connect the gate with the rod 29 I employ brackets consisting of stems 40 having divergent arms 41 at their rear ends and eyes 42 at their front ends. The arms 41 are secured to the outer surfaces of the side plates 37 at the lower front corners of the same, as shown clearly in Fig. 7, and the eyes 42 are pivotally engaged upon the rod 29 as will be readily understood. The gate will thus be mounted for vertical pivotal movement and splitting or breaking of the members thereof will be guarded against. The angle-irons 39 are permanently secured to the side plates 37 and are secured to the back plate by removable bolts. When the machine is to be used on narrow rows or a single row, the bolts are removed, the side plates moved inwardly relative to the back plate and the bolts inserted to secure them in the new positions as will be understood on reference to Figs. 4 and 5. The side plates 37 should be of such length that when the device is lowered the lower edge of the back plate 38 will rest upon the long fingers 28, it being readily noted that the fingers are of different lengths so that the alternate fingers will have their offsets 32 disposed respectively in advance and in rear of said back plate. The offsets of the shorter fingers will serve to prevent the vegetables or plants passing directly under the lower edge of the back plate and the offsets of the longer fingers will support the said back plate so that the lower edge thereof will not dig into the ground and drag thereon to impede the progress of the machine and unnecessarily scrape the surface of the ground. Upon the back plate I secure a hinge member 43 to the upper end of which is hingedly or pivotally attached the lower end of a connecting rod 44 which has its upper end pivoted to the rearwardly extending arm 45 of an angle lever which is fulcrumed upon the draft pole or tongue at the rear end thereof and has its forward arm 46 extending upwardly. A pitman 47 is pivoted to the free end of the arm 46 and extends forwardly to a foot lever or treadle 48 which is fulcrumed upon the draft pole or tongue at a point where it can be conveniently reached by the driver. Ordinarily the weight of the buncher gate will cause the same to rest upon the fingers 28 so that the vegetables or plants deposited upon said fingers will be retained thereon until a suitable quantity has been gathered. When the predetermined quantity has been delivered onto the fingers 28, the foot lever 48 is swung forwardly and this movement of said lever is transmitted through the described connections to the gate so as to raise the same, as shown in the drawings, and permit the gathered plants or vegetables to be discharged from the rear ends of the fingers 28 and left upon the ground to be subsequently taken up and prepared for market.

When it is desired to dig potatoes or to work on only a single row, the knives 25 and 26 are removed and a knife 49 disposed below the tongue is used. The knife 49 is carried by standards 49' similar in all respects to the standards 16 and mounted in hangers 50' on the tongue. From the rear edge of the knife 49, a plurality of guide rods or fingers 50 extend in spaced relation rearwardly over and beyond the rod 29 so that the potatoes dug up by the knife 49 will be directed into the buncher. A lever 51, mounted on the tongue in the same manner that the levers 22 are mounted on the frame, is connected with one of the standards 49' to adjust the knife 49 vertically. When the machine is arranged for use as a bean harvester, two spacing sleeves or collars 31 are arranged between each pair of adjacent fingers 28. When, however, the device is to be used as a potato digger, one spacing collar is removed from between each two fingers and these collars are placed at the ends of the rod 29 so that an equal number will be fitted upon each end of the rod. The fingers will thus be brought closer together and the small potatoes will be prevented from escaping and be directed into the buncher, the side plates of which are adjusted in the manner hereinbefore described. The buncher gate will be manipulated to control the discharge of potatoes in the same manner that it is manipulated to control the discharge of beans.

My device is free of all complicated arrangements so that it may be manufactured at a low cost and may be readily arranged by an unskilled person for use as a bean harvester or as a potato digger. If the machine be extended, for instance, to accommodate rows thirty-two inches apart, it can be made to cut three rows sixteen inches apart by merely employing the knife 49 simultaneously with the knives 25.

Having thus described my invention, what is claimed as new is:

1. In a machine for the purpose set forth, the combination of a wheeled frame, harvesting members carried by and depending from said frame, a transverse rod disposed below the frame and in rear of the harvesting members, diverging arms secured to the ends of said rod, connections between the forward arms and the frame, adjustable connections between the rearward arms and the rear end of the frame, a plurality of fingers pivotally mounted at their front ends upon the said rod and extending therefrom in parallel relation, a gate consisting of a back plate and side plates, the side plates being provided with brackets encircling the said transverse rod, a suspending device attached to the back plate, and means on the frame connected with said suspending device to raise and lower the gate.

2. In a machine for the purpose set forth, the combination of a wheeled main frame, harvesting members carried by said frame, a transverse rod supported from the main frame below the same and in rear of said harvesting members, a plurality of spaced fingers having their front ends pivotally encircling said rod and having their rear ends free and vertically offset, a gate pivotally mounted at its lower front corners upon said transverse rod and adapted to rest upon some of said fingers at the offset portion thereof, and means upon the frame for raising and lowering said gate.

3. In a machine for the purpose set forth, the combination of a wheeled frame, harvesting members carried by said frame, a transverse rod supported by the frame below the same and in rear of the harvesting members, a plurality of spaced fingers having their front ends pivotally encircling the said rod and having their rear ends free, a gate consisting of side plates having their lower front corners pivotally supported upon the said rod and a back plate secured to and bridging the rear ends of said side plates, the side plates being adjustable from and toward the ends of the back plate and means upon the main frame for raising and lowering said gate.

In testimony whereof I affix my signature.

MICHAEL L. SWAYZE. [L. S.]